(12) United States Patent
Disantis (10) Patent No.: US 9,833,847 B2
(45) Date of Patent: Dec. 5, 2017

(54) COMPOUND WIRE ROPE CUTTER (71) Applicant: The National Telephone Supply Company, Cleveland, OH (US)

(72) Inventor: Raymond Disantis, Willoughby Hills, OH (US)

(73) Assignee: The National Telephone Supply Company, Cleveland, OH (US)

( * ) Notice: Subject to any disclaimer, the term of this patent is extended or adjusted under 35 U.S.C. 154(b) by 108 days.

(21) Appl. No.: 14/845,753

(22) Filed: Sep. 4, 2015

(65) Prior Publication Data
US 2017/0066067 A1    Mar. 9, 2017

(51) Int. Cl.
B23D 29/02    (2006.01)
B23D 29/00    (2006.01)

(52) U.S. Cl.
CPC ......... B23D 29/023 (2013.01); B23D 29/002 (2013.01)

(58) Field of Classification Search
CPC ............................ B23D 29/002; B23D 29/023
USPC ..................................... 30/252, 258
See application file for complete search history.

(56) References Cited

U.S. PATENT DOCUMENTS

| 92,202 | A | | 7/1869 | McFarlane | |
|---|---|---|---|---|---|
| 709,522 | A | | 9/1902 | Stewart | |
| 1,446,540 | A | * | 2/1923 | Bernard | B23D 29/023 30/193 |
| 2,005,694 | A | * | 6/1935 | Vosbikian | A01G 3/0475 30/237 |
| 2,248,796 | A | * | 7/1941 | Vosbikian | B23D 29/026 30/252 |
| 2,997,787 | A | * | 8/1961 | Wheeler | B23D 29/023 30/90.2 |
| 3,372,478 | A | * | 3/1968 | Wallace | A01G 3/0251 30/193 |
| 3,495,331 | A | * | 2/1970 | Riggs | B23D 29/023 30/233 |
| 4,644,652 | A | * | 2/1987 | Davis | A01G 3/0251 30/252 |
| 5,003,695 | A | * | 4/1991 | Lipscomb | B26B 17/02 30/186 |
| 5,544,416 | A | | 8/1996 | Lin | |
| 6,493,943 | B1 | | 12/2002 | Linden | |
| 9,296,116 | B2 | * | 3/2016 | Descombes | B26B 17/02 |
| 2006/0112567 | A1 | * | 6/2006 | Tsai | B23D 29/023 30/252 |

(Continued)

FOREIGN PATENT DOCUMENTS

EP    0 116 711 A2 * 12/1983
EP    2 371 494 B1 *  9/2016

*Primary Examiner* — Hwei C Payer
(74) *Attorney, Agent, or Firm* — FaySharpe LLP; James E. Scarbrough (57) ABSTRACT

A wire rope cutter includes a first handle and a second handle, a first cutting jaw and a second cutting jaw, a first pivot for pivotally connecting the first jaw and the first handle; and a second pivot for pivotally connecting the second jaw to the second handle. A third pivot pivotally connects the first handle to the second handle, and a fourth pivot pivotally connects the first jaw to the second jaw. The first jaw includes a web area having an elongated opening, and the second jaw includes a web area having an elongated opening. The third pivot is formed by a fastener extending through the elongated openings of the first jaw web area and the second jaw web area for pivotally connecting the handles together.

20 Claims, 8 Drawing Sheets

(56) References Cited

U.S. PATENT DOCUMENTS

| | | |
|---|---|---|
| 2010/0236079 A1 | 9/2010 | Bush |
| 2012/0186087 A1* | 7/2012 | Huang ................. A01G 3/0251 30/252 |
| 2013/0239417 A1* | 9/2013 | Disantis ................. B26B 13/00 30/254 |
| 2013/0247385 A1* | 9/2013 | Pisczak ................ B23D 29/002 30/252 |
| 2017/0066067 A1* | 3/2017 | Disantis ............... B23D 29/023 |

* cited by examiner

COMPOUND WIRE ROPE CUTTER

BACKGROUND OF THE DISCLOSURE

This disclosure relates to wire rope cutters. More particularly, this disclosure relates to wire rope cutters with a compound mechanical advantage.

Existing cutting tools which may use a mechanical advantage are sometimes used in the arbor industry for cutting small diameter wire rope. Some existing cutters supposedly utilizing a compound mechanical advantage so that the cutting jaws are better enabled to open further. The opposite is actually the case. The handles must be opened further than with a single stage cutter in order to open an equivalent amount to a single stage cutter.

An example of an existing cutter is shown in U.S. Pat. No. 92,202. However, the cutter mechanism in U.S. Pat. No. 92,202 is used in the arbor industry and does not save space or overall length.

Existing cutting tools utilize a fulcrum method to generate additional force for the purpose of cutting through wire rope. (See FIG. 1). This results in a mechanical advantage which is typically defined as the ratio of the output force created by a mechanism divided by the applied input force. However, due to the length of a handle from a pivot compared to the length of the cutting jaw, a single mechanical advantage is developed. The mechanical advantage (MA) is defined as the pivot handle length divided by the pivot jaw length or:

MA=Pivot Handle Length/Pivot Jaw Length

Figure 9:
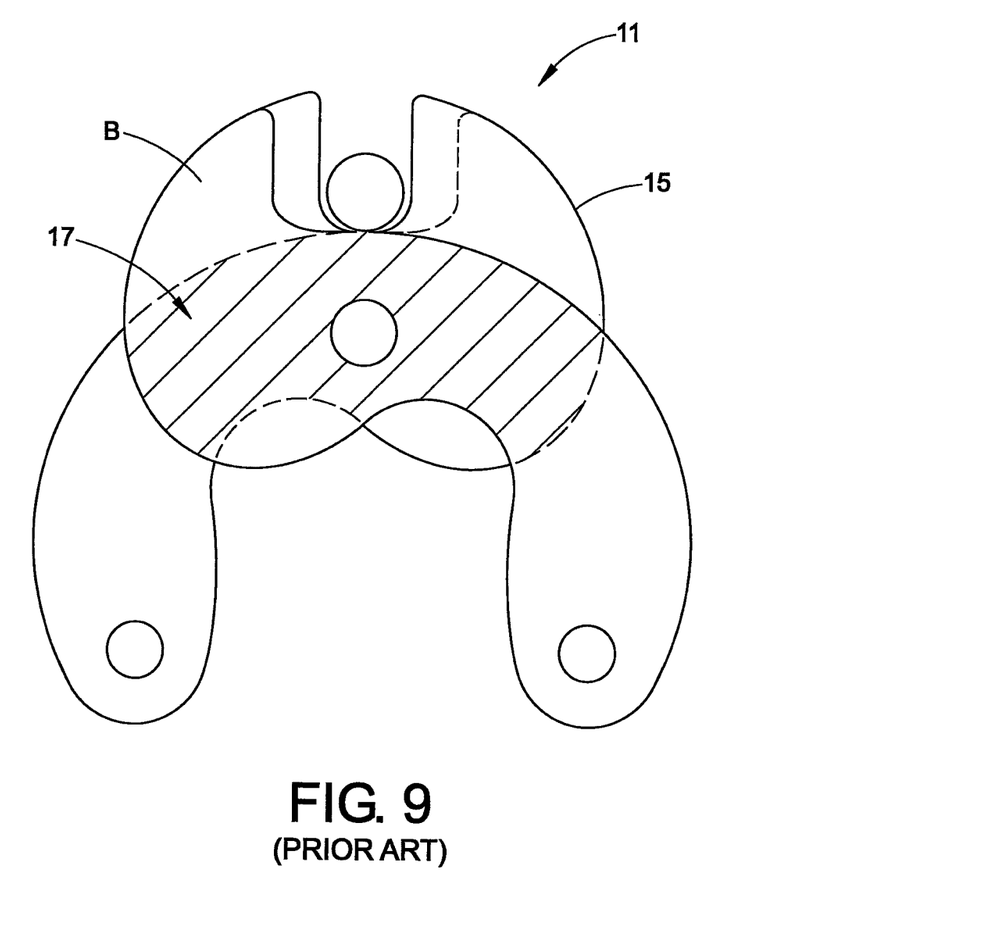
FIG. 9 is a top plan view of a cutter jaw assembly with minimal bearing area.

Another compound wire rope cutter is shown in Published Application No. US 2013/0247385 which is incorporated by reference herein. Referring to FIG. 9, a problem with this cutter 11 is the original cutter blades B, 15 had insufficient bearing area 17, thus allowing the cutter blades to twist and the main pivot screw to elongate under the heavy loading of cutting large diameter cables. This deformation creates a gap between the blades during actual cutting of cables and the strands of the cable get caught in the gap. Consequently, the cut is incomplete and the cutter is jammed. An example of this would be trying to cut a thick, tough piece of material with an ordinary hand scissor. The material would get stuck between the blades. Thus, there exists a need for a wire rope cutter which is much more rigid with increased bearing area and has two screws holding the cutter halves together.

Thus, there exists a need for a wire rope cutter which has a compound mechanical advantage. There also exists a need for a compound cutter which is nested and has a reduced overall length.

There also exists a need for an increase in bearing area for cutter blades for increasing the rigidity and stiffness of the cutter blades.

Other benefits and aspects of the disclosure will become apparent upon a reading and understanding of the following detailed description.

SUMMARY OF THE DISCLOSURE

In accordance with one embodiment of the disclosure, a wire rope cutter has a first handle and a second handle; a first lever and a second lever; a first cutting jaw and a second cutting jaw; wherein the first cutting jaw is formed at a distal end of said first lever; said second cutting jaw is formed at a distal end of the second lever; a first pivot for pivotally connecting the first handle and the second handle; a second pivot for pivoting connecting the first lever to the first handle; a third pivot for pivotally connecting the second lever to the second handle; and a fourth pivot for pivotally connecting the first lever to the second lever.

In accordance with another embodiment of the disclosure, a compound wire rope cutter assembly has a first handle and a second handle having a first pivot connecting the first and second handles; a first cutting jaw half and a second cutting jaw half, wherein the first cutting jaw half is connected to the first handle via a second pivot; wherein the second cutting jaw half is connected to the second handle via a third pivot; and wherein the first cutting jaw half and the second cutting jaw half are connected by a fourth pivot; wherein a compound mechanical advantage is defined by a first mechanical advantage defined by a pivot lever length and a pivot jaw length, and a second mechanical advantage defined by a handle length and a pivot handle length.

Another embodiment of the disclosure is a compound mechanical advantage formed by a first mechanical advantage and a second mechanical advantage.

In accordance with still another embodiment of the disclosure is a wire rope cutter, comprising: a first handle and a second handle; a first cutting jaw and a second cutting jaw; a first pivot for pivotally connecting the first jaw and the first handle; a second pivot for pivotally connecting the second jaw to the second handle; a third pivot for pivotally connecting the first handle to the second handle; and a fourth pivot for pivotally connecting the first jaw to the second jaw, wherein the first jaw has a web area comprising an elongated opening; wherein the second jaw comprises a web area having an elongated opening; wherein the third pivot is formed by a fastener extending through the elongated openings.

Still other embodiments of the disclosure will become apparent upon a reading and understanding of the following detailed description.

DETAILED DESCRIPTION OF THE DISCLOSURE

The present disclosure relates to wire rope cutters. More particularly, it relates to a wire rope cutter having a compound mechanical advantage.

Figure 1:
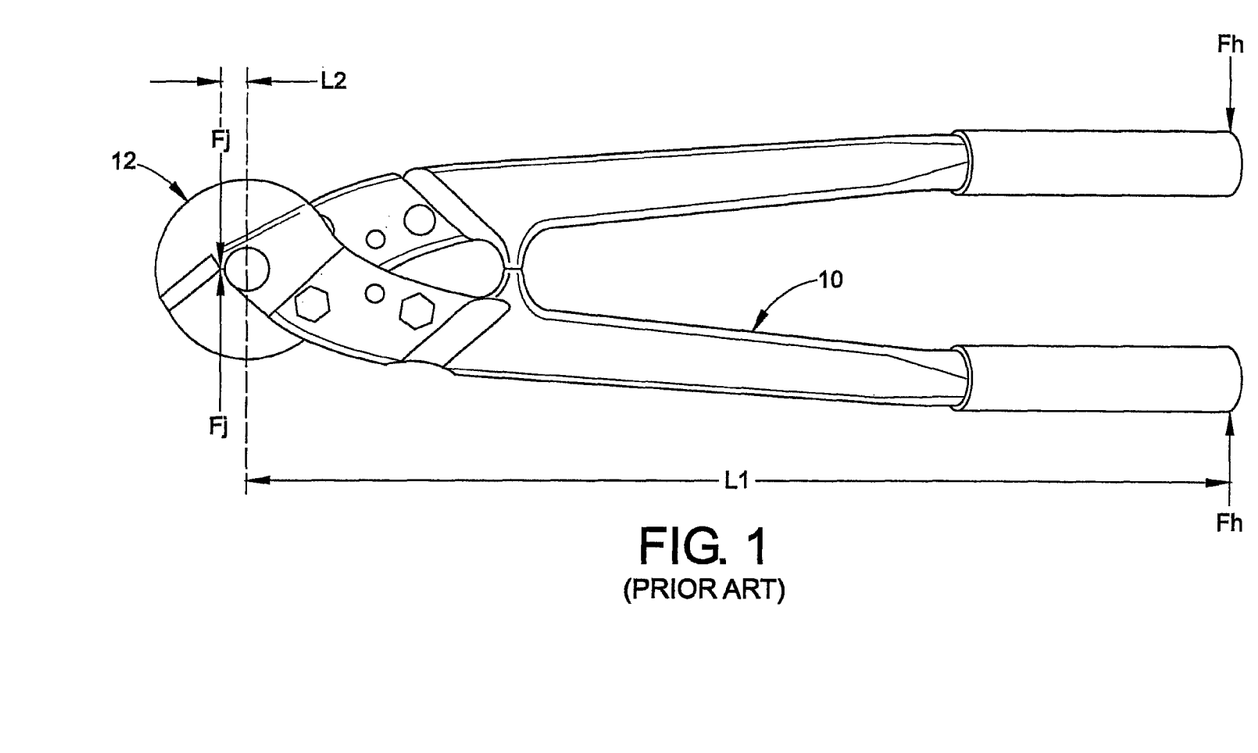
FIG. 1 illustrates an existing cutter which uses a fulcrum method to generate additional force.

Existing cutter tools typically use a single fulcrum method to generate additional force for the purpose of cutting through wire rope. Referring to FIG. 1, an existing cutter tool has a pivot handle 10 which has a pivot handle length (L1) of e.g., about 18.25 inches. A jaw 12 has a pivot jaw length (L2) of e.g., about 0.562 inches. The force applied at the jaw is shown as Fj and the force applied at the handle is shown as Fh. The force is applied as pounds force. Due to the length of the handle from the pivot when compared to the length of the cutting jaw to the pivot a mechanical advantage (MA) is developed as the pivot handle length (L1) divided by the pivot jaw length (L2), or:

$$MA = \frac{L1}{L2}$$

$$\text{or } \underline{32.44} = \frac{18.25}{0.562}$$

Thus the mechanical advantage is 32.44.

Figure 2:
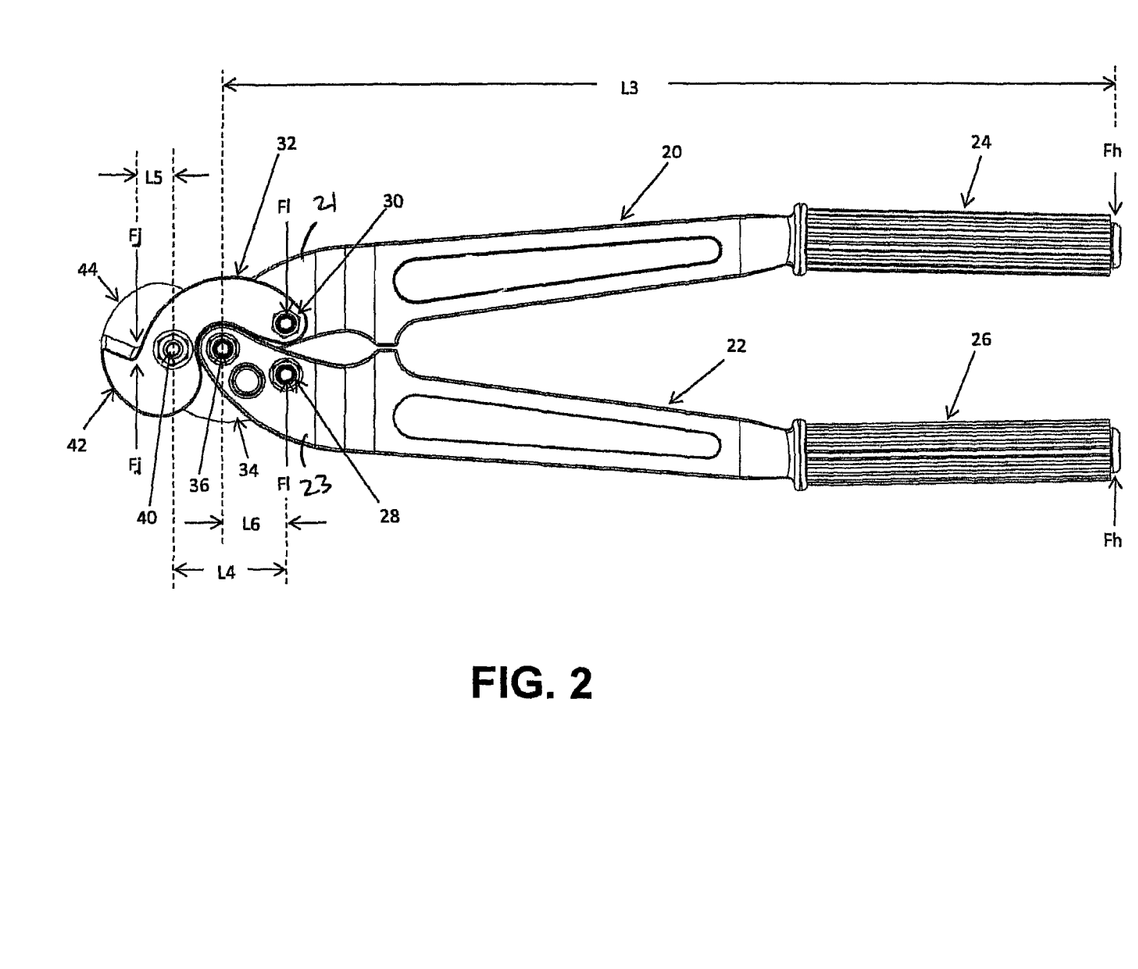
FIG. 2 illustrates a top plan view of a compound wire rope cutter in accordance with an embodiment of the disclosure.
Figure 3:
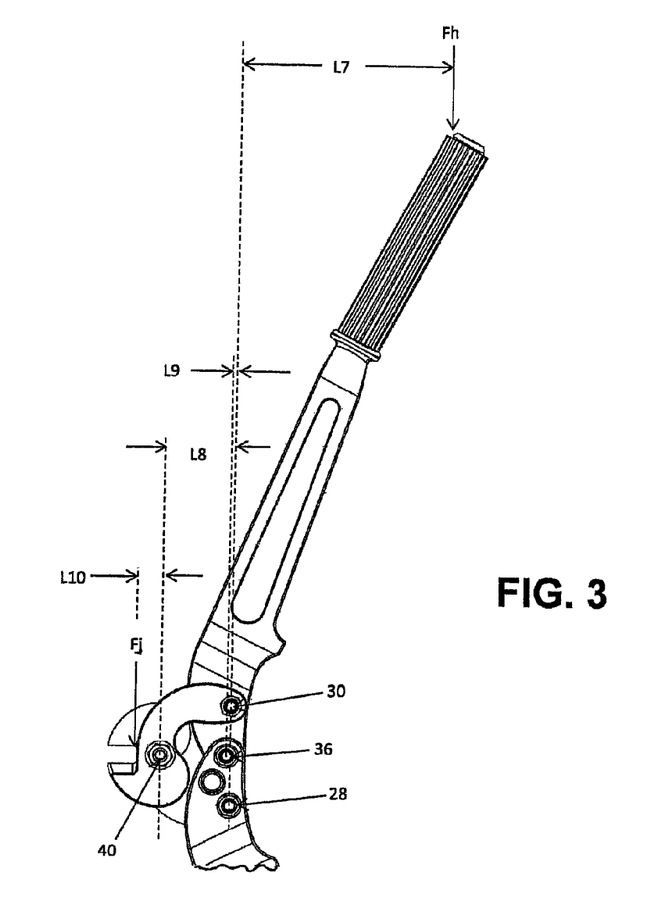
FIG. 3 illustrates a partial top plan view of the cutter of FIG. 2 in an opened position.
Figure 4:
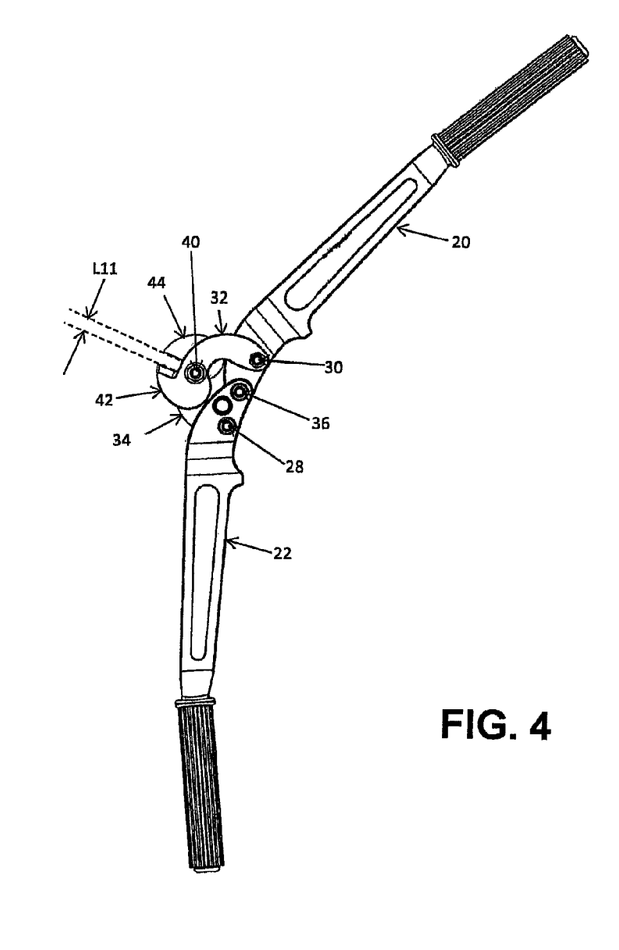
FIG. 4 illustrates a top plan view of the cutter of FIG. 2 in a fully opened position.

Referring now to FIGS. 2-4, a compound wire rope cutter in accordance with an embodiment of the disclosure is shown. A compound mechanical advantage is defined as a mechanical advantage combined with or superimposed onto another mechanical advantage. The force applied at the jaw is shown as Fj and the force applied at the levers is shown as Fl and the force applied at the handle is shown as Fh. The force is applied as pounds force.

Referring to FIG. 2, the cutter in accordance with one aspect of the disclosure has handles 20, 22 which are preferably symmetrical and preferably made of aluminum and are corrosion resistant. Each handle has an angled or curved portion 21, 23 which are angled in opposite directions to which the levers 32, 34 are pivotally mounted. Ends of the curved portions 21, 23 curve each other in an assembled configuration.

Due to lower handle forces, lighter weight material such as aluminum can be used. The handles can have grips 24, 26 formed of a suitable grippable material such as an extruded Santoprene™. However, other materials are also contemplated by the disclosure.

There are two lever pivots 28, 30 for levers 32, 34 and handle pivot 36 for handles 20, 22. A jaw pivot 40 is used for pivoting cutting jaws 42, 44. Cutting jaws 42, 44 are symmetrical and are preferably made of a steel alloy. The pivots 28, 30, 36, 40 form the nested compound force multiplier section of the cutter.

Referring now to FIG. 2, the handle length L3 can be about 16.925 inches from an end of the handle (where force Fh is applied) to the handle pivot 36. The pivot lever length L4, i.e., the distance between jaw pivot 40 and lever pivots 28, 30 (where force Fl is applied) is about 2.144 inches. The pivot jaw length L5, i.e., the distance between jaw pivot 40 and an inner edge of the jaw (where force Fj is applied) is about 0.622 inches. The pivot handle length L6, i.e., the distance between handle pivot 36 and lever pivots 28, 30 is about 1.200 inches. Thus, the first mechanical advantage MA1 is calculated as follows:

MA1 is the pivot lever length L4 divided by the pivot jaw length L5, or:

$$MA1 = \frac{L4}{L5}$$

$$\text{or } \underline{3.45} = \frac{2.144}{0.622}$$

Thus, the first mechanical advantage MA1 is approximately 3.45. The second mechanical advantage MA2 is calculated as the handle length L3 divided by the pivot handle length L6, or:

$$MA2 = \frac{L3}{L6}$$

$$\text{or } \underline{14.10} = \frac{16.925}{1.200}$$

Thus, the second mechanical advantage MA2 is approximately 14.10. The overall compound mechanical advantage MAC, at this particular angle of handle opening, is MA1 multiplied by MA2 or MA1×MA2 or 3.45×14.10=48.66. Thus, compound mechanical advantage MAC is approximately 48.66.

Thus, the advantage of the present disclosure when compared to an existing tool is therefore 48.66/32.44=1.5. In other words, the tool requires less force, or 1/1.5 or approximately two-thirds or about 0.67 times the amount of force required as an existing tool to cut a wire rope; again, at this particular angle of handle opening.

The compound mechanical advantage of the present disclosure is different when the tool is opened to allow the insertion of the largest diameter wire rope (i.e., about 10 mm). That is, the opening L11 between the jaws is about 10 mm (see FIG. 4).

Referring now to FIG. 3, the handle length L7, i.e., the distance from an end of the handle (where force Fh is applied) to the handle pivot 36 is about 5.578 inches. The pivot lever length L8, i.e., the distance between lever pivots 28, 30 and jaw pivot 40 is about 1.780 inches. The pivot handle length L9, i.e., the distance between lever pivots 28, 30 and pivot 36 is about 0.099 inches. The pivot jaw length L10, i.e., the distance between pivot 40 and the inside edge of a jaw is about 0.664 inches. A first mechanical advantage is defined as the pivot lever length L8 divided by the pivot jaw length L10, or:

$$MA3 = \frac{L8}{L10}$$

$$\text{or } \underline{2.681} = \frac{1.780}{0.664}$$

and

The second mechanical advantage is defined as the handle length L7 divided by the pivot handle length L9, or:

$$MA4 = \frac{L7}{L9}$$

$$\text{or } \underline{56.343} = \frac{5.578}{0.099}$$

Thus, overall compound mechanical advantage MAC2 in this case is MA3 multiplied by MA4 or MA3×MA4=2.681× 56.343=151.06.

That is, the compound mechanical advantage MAC2 is approximately 151.06/48.66=3.1 times greater than when the tool is closed as in the previous case.

The tradeoff between the closed and open tool is the amount of jaw closure relative to the angle movement of the handles. For example, when the tool is opened the amount of jaw closure is proportionately smaller when the handles proceed to close.

This is significant since the force required to initiate the cutting is greatest for the largest diameter wire rope. From an ergonomic point of view the handles are at their further apart configuration.

Therefore, the compound mechanical advantage is greatest when the wire rope is of the largest diameter. This is a distinct advantage over the single mechanical advantage of many existing tools and the forward toggle design as used by others.

Figure 5:
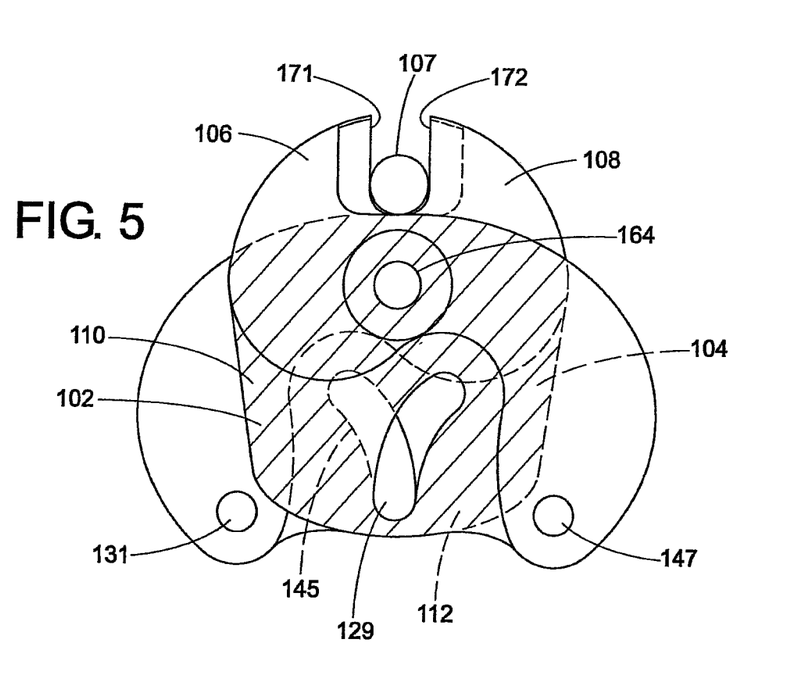
FIG. 5 is a top plan view of a cutter jaw arrangement in accordance with another embodiment of the disclosure.
Figure 6:
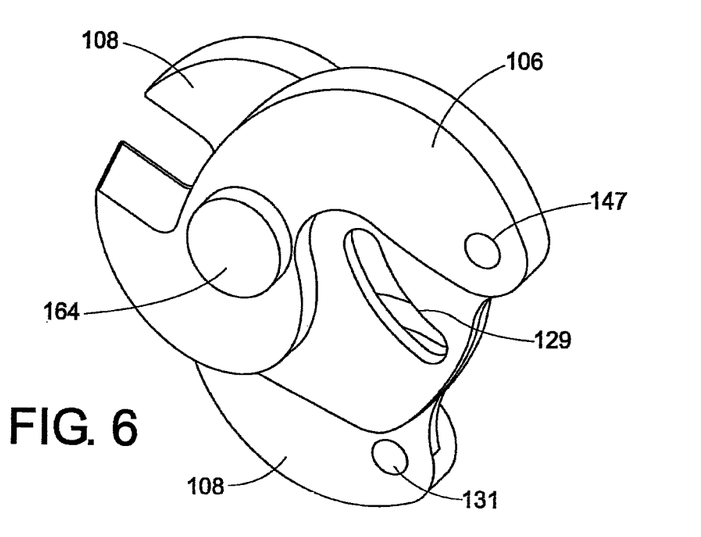
FIG. 6 is a perspective view of the cutter jaw assembly of the cutter assembly of FIG. 5.

Referring now to FIGS. 5-8, a cutter jaw assembly 100 in accordance with a preferred embodiment of this disclosure is shown. The cutter jaw assembly 100 has similar compound mechanical advantages as described for FIGS. 2-4. Specifically, referring to FIGS. 5 and 6, webbing or web areas 102, 104 are added to substantially "S" shaped cutter blade or jaw assemblies 106, 108 which increases both the stiffness and the bearing area of each blade. Referring to FIG. 5, the webbing 102, 104 significantly increases and adds bearing area 110, 112 between the opposing blades particularly when cutting the largest diameter ropes 107. The stresses on the cutter are the greatest while cutting the largest ropes as well. This increase in bearing area 110, 112 also significantly improves the rigidity of the blade assembly as well.

Figure 8:
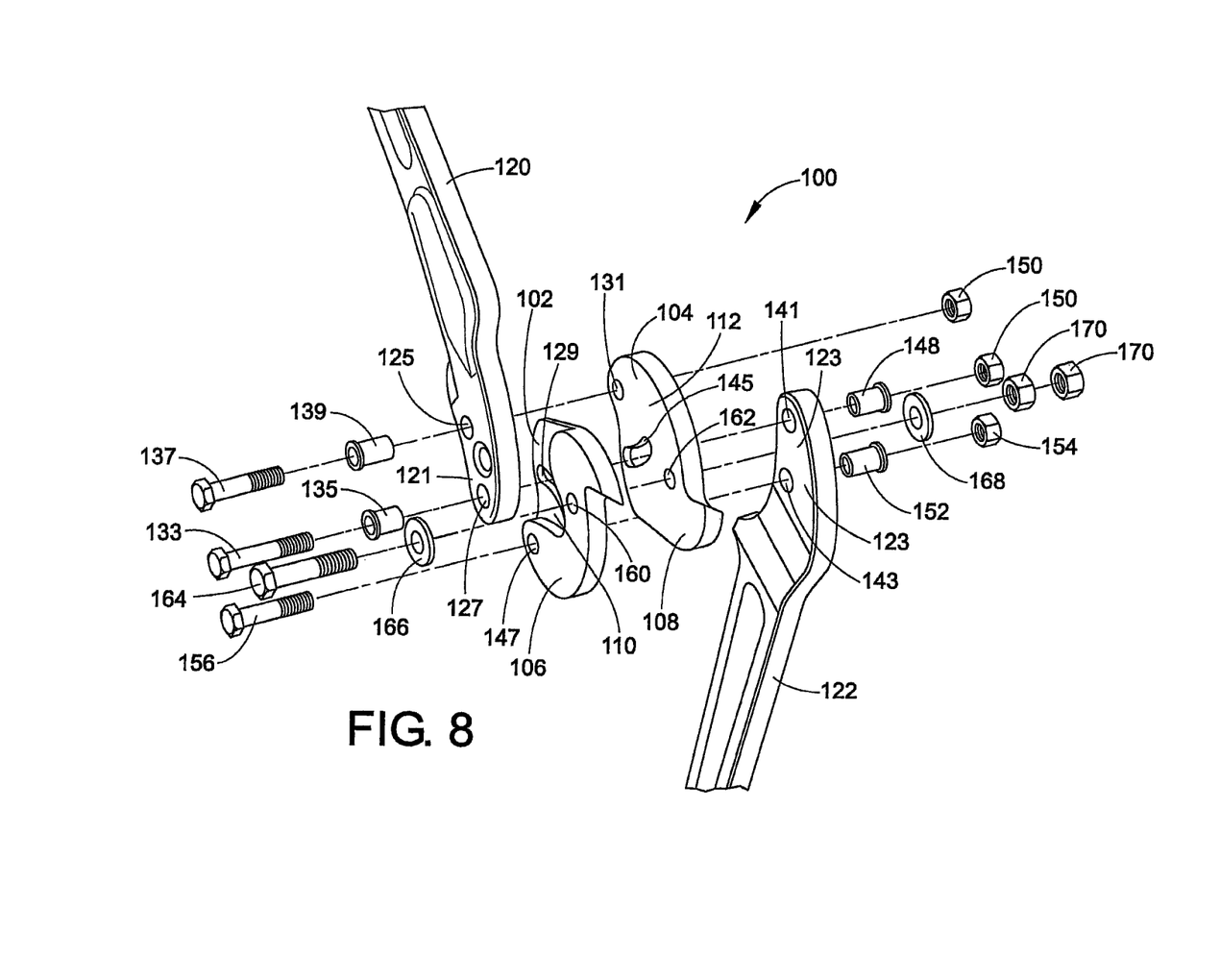
FIG. 8 is an exploded perspective view of the cutter jaw assembly of FIG. 7.

Referring now to FIG. 8, an exploded view of the cutter jaw assembly 100 is shown. Specifically, the cutter 100 has handles 120, 122 which are preferably symmetrical and preferably made of aluminum and are corrosion resistant. Each handle has an angled or curved portion 121, 123 which are angled in opposite directions to which the blades or jaws 106, 108 are pivotally mounted. Ends of the curved portions 121, 123 curve opposite each other in an assembled configuration.

Handle portion 121 has a pair of openings 125, 127, wherein opening 125 aligns with opening 131 of web 104 of jaw 108 to form a handle pivot with jaw 108. A toggle fastener 137, a hard bushing 139 and hex nut 150 are preferably used together to pivotably retain handle portion 121 to jaw 108 and web 104 via aligned openings 125, 131.

Opening 127 of handle portion 121 aligns with elongated toggle slot 129 formed in web 102 of jaw 106 to form a toggle pivot with jaw 106. Preferably a toggle pivot bolt 133 and a hard bushing 135 retains portion 121 to jaw 106 through aligned openings 127, 129 to form a toggle pivot.

Opening 141 of handle portion 123 aligns with elongated toggle slot 145 of web 104 of jaw 108 to form a toggle pivot. Preferably toggle pivot bolt 133, hard bushing 148 and a nut 150 pivotably retain portion 123 to jaw 108 and web 104 to form a toggle pivot through aligned openings 141, 145.

Opening 147 of jaw 106 and opening 143 of handle portion 123 align to form a handle pivot for handle 122. Toggle fastener 156, hard bushing 152 and nut 154 pivotably retain handle 123 to jaw 106 via aligned openings 147, 143.

Elongated toggle slot 129 is curved in an opposite direction to elongate toggle slot 145.

A main cutter pivot bolt 164, hard washers 166, 168, and hex jam nuts 170 extend through an opening 160 formed in jaw 106 and an opening 162 formed in jaw 108 to pivotably hold the jaws 106, 108 together.

When the blade assembly 100 is rigid, the gap between the opposed cutter blade bearing areas 110, 112 are minimized during cutting, thus putting the wire rope more in pure shear and consequently making a cleaner cut. Also, gaps between the cutter blade faces during the stress and deflection of cutting wire rope allows small diameter strands from the wire rope to lodge between the cutter blade faces, thus jamming the cutter or leaving the wire rope with an incomplete cut. An example would be a hand scissor cutting relatively thick foil. The scissor blades would bend and separate and then the foil would get trapped between the blades.

Figure 7:
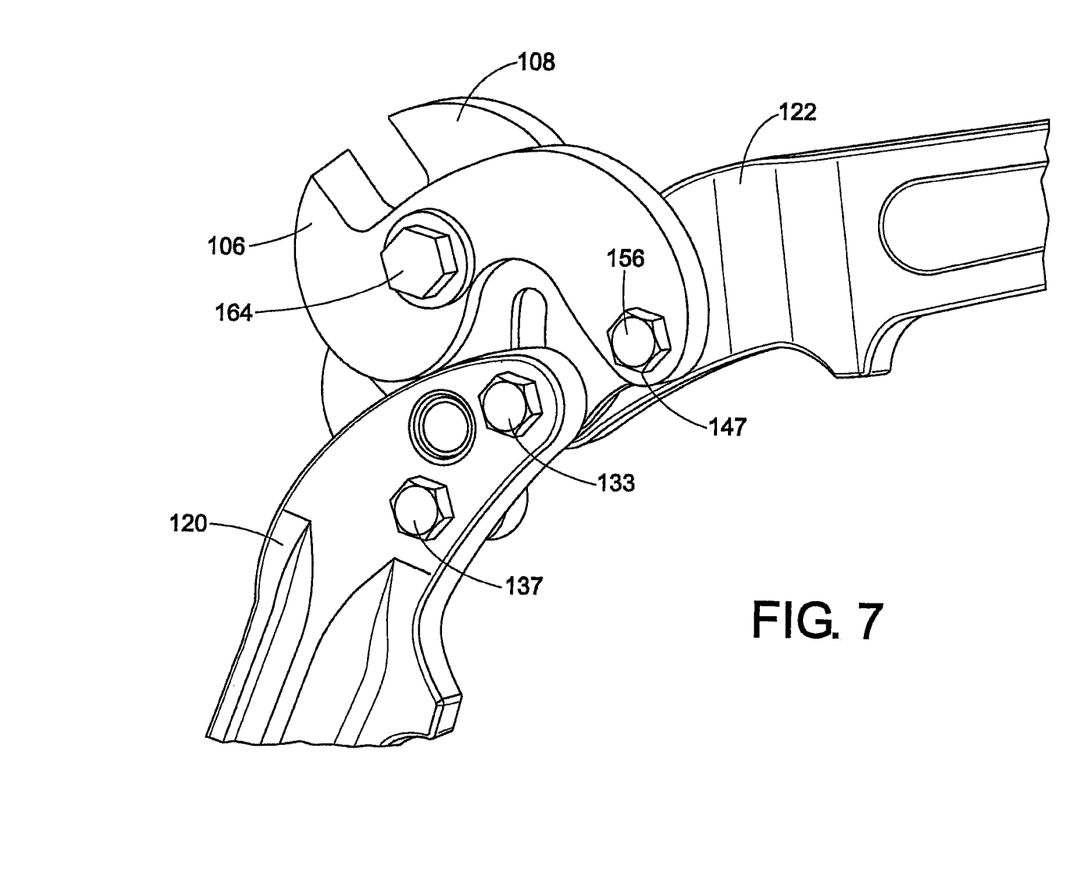
FIG. 7 is another perspective view of the cutter assembly of FIG. 5.

Also, the toggle pivot bolt 133 holds the cutter halves together through slots 129, 145 in addition to the main pivot bolt 164 thereby significantly improving the rigidity of the cutter blade assembly 100 (See FIG. 7). The cutter jaw assembly of FIGS. 5-8 allows for all bearing wear contact surfaces including bearing areas 110, 112 to be fabricated from hard materials such as high carbon steel or tool steel hardened to a minimum of Rc 50. Hard bushing 139 contacts web surface 104, while hard bushing 152 contacts surface 102. Hard bushing 135, 148 contact web surfaces 102 and web surfaces 104.

Cutting faces 171, 172 formed on edges of jaws 106, jaws 108 are used to cut wire rope 107, particularly of a large diameter.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the above description and the appended claims or the equivalents thereof.

The invention claimed is:

1. A wire rope cutter, comprising:
a first handle and a second handle;
a first cutting jaw and a second cutting jaw;
a first pivot for pivotally connecting said first jaw and said first handle;
a second pivot for pivotally connecting said second jaw to said second handle;
a third pivot for pivotally connecting said first handle to said second handle; and
a fourth pivot for pivotally connecting said first jaw to said second jaw,
wherein said first jaw comprises a substantially s-shaped first cutting blade and a first web area comprising an elongated opening, wherein said first cutting blade is formed by a raised portion connected to said first web area; wherein said second jaw comprises a substantially s-shaped second cutting blade and a second web area comprising an elongated opening, wherein said second cutting blade is formed by a raised portion connected to said second web area; wherein said third pivot is formed by a fastener extending through said elongated openings of said first jaw web area and said second jaw web area.

2. The wire rope cutter of claim 1, wherein said first handle and said second handle each comprise a curved portion which are curved in opposite directions.

3. The wire rope cutter of claim 1, wherein said first jaw and said second jaw each comprises a second opening.

4. The wire rope cutter of claim 3, wherein said first handle and said second handle each comprises an opening.

5. The wire rope cutter of claim 4, wherein said opening of said first handle aligns with said second opening of said first jaw to receive a first pivot member.

6. The wire rope cutter of claim 5, wherein said opening of said second handle aligns with said second opening of said second jaw to receive a second pivot member.

7. The wire rope cutter of claim 6, wherein said first handle comprises a second opening and said second handle comprising a second opening.

8. The wire rope cutter of claim 7, wherein said second opening of said first handle and said second opening of said second handle align with said elongated opening of said first jaw web area and said elongated opening of said second jaw web area to receive a third pivot member.

9. The wire rope cutter of claim 8, wherein said first jaw comprises a third opening and said second jaw comprises a third opening.

10. The wire rope cutter of claim 9, wherein said third opening of said first jaw and said third opening of said second jaw align to receive a fourth pivot member.

11. The wire rope cutter of claim 1, wherein said web area of said first jaw forms a bearing surface for said first jaw.

12. The wire rope cutter of claim 1, wherein said web area of said second jaw forms a bearing surface for said second jaw.

13. The wire rope cutter of claim 1, wherein said elongated opening of said web area of said first jaw comprises an arcuate slot.

14. The wire rope cutter of claim 13 wherein said elongated opening of said web area of said second jaw comprises an arcuate slot.

15. The wire rope cutter of claim 14, wherein said arcuate slot of said web area of said first jaw is curved in an opposite direction to said arcuate slot of said web area of said second jaw.

16. The wire rope cutter of claim 5, wherein said first pivot member comprises a toggle fastener, a bushing and a nut.

17. The wire rope cutter of claim 6, wherein said second pivot member comprises a toggle fastener, a bushing and a nut.

18. The wire rope cutter of claim 8, wherein said third pivot member comprises a toggle bolt, a pair of bushings, and a nut.

19. The wire rope cutter of claim 18, wherein said toggle bolt holds said web areas of said first and second jaws together to increase rigidity of said wire rope cutter.

20. The wire rope cutter of claim 10, wherein said fourth pivot member comprises a pivot bolt, a pair of washers and nuts for holding said first and second jaws together.

* * * * *